US012512583B2

(12) United States Patent
Rouaissia

(10) Patent No.: US 12,512,583 B2
(45) Date of Patent: Dec. 30, 2025

(54) PROXIMITY SENSOR FOR RF CONTROL

(71) Applicant: Semtech Corporation, Camarillo, CA (US)

(72) Inventor: Chaouki Rouaissia, Neuchâtel (CH)

(73) Assignee: Semtech Corporation, Camarillo, CA (US)

( * ) Notice: Subject to any disclaimer, the term of this patent is extended or adjusted under 35 U.S.C. 154(b) by 135 days.

(21) Appl. No.: 17/894,814

(22) Filed: Aug. 24, 2022

(65) Prior Publication Data

US 2023/0091264 A1 Mar. 23, 2023

Related U.S. Application Data

(60) Provisional application No. 63/247,537, filed on Sep. 23, 2021.

(51) Int. Cl.
*H01Q 1/48* (2006.01)
*H01Q 1/24* (2006.01)

(52) U.S. Cl.
CPC ............... *H01Q 1/48* (2013.01); *H01Q 1/243* (2013.01)

(58) Field of Classification Search
CPC .......... H01Q 1/48; H01Q 1/243; H01Q 5/335; H04B 1/18; H04B 1/0458
See application file for complete search history.

(56) References Cited

U.S. PATENT DOCUMENTS 3,281,721 A * 10/1966 Clark ................... H03H 7/40
  333/17.1
6,219,532 B1 * 4/2001 Tanaka ................. H03H 7/40
  455/78

(Continued)

FOREIGN PATENT DOCUMENTS

CN 104137331 A 11/2014
CN 110199480 A 9/2019
(Continued)

OTHER PUBLICATIONS

Office Action received for Chinese Patent Application No. 202211156502.4, mailed on Sep. 9, 2024, 12 pages of English Translation only.

*Primary Examiner* — Graham P Smith
(74) *Attorney, Agent, or Firm* — Blank Rome LLP

(57) ABSTRACT

The invention relates to an electronic component for adapting a pre-set matched impedance for an antenna. The electronic component comprises 1) a capacitance measurement circuit for measuring capacitance of a sensor, wherein the measured capacitance is indicative of a use case of the antenna, 2) a Radio Frequency (RF) switch configured for electrically connecting at least one selected impedance to an RF output, wherein the at least one selected impedance is an impedance in a group of impedances having at least two elements, wherein the RF switch is capable of providing an electrical connection between any impedance in the group of impedances and the RF output, and wherein the at least one selected impedance is configured for adapting the pre-set matched impedance, and 3) a digital processor having access to at least one threshold and the measured capacitance. The digital processor is configured (i) to compare the measured capacitance of the sensor provided by the capacitance measurement circuit to the at least one threshold, (ii) to determine, based on the comparison, which impedance in the group of impedances is the at least one selected impedance, and (iii) to instruct the RF switch to provide an electrical connection between the at least one selected impedance and the RF output. The invention also relates to a method for adapting a pre-set matched impedance for an antenna.

7 Claims, 1 Drawing Sheet

(56) References Cited

U.S. PATENT DOCUMENTS

| | | | |
|---|---|---|---|
| 6,566,944 B1* | 5/2003 | Pehlke | H03F 1/0233 |
| | | | 330/136 |
| 8,971,826 B2 | 3/2015 | Abdul-Gaffoor et al. | |
| 9,247,504 B2* | 1/2016 | Erkens | H04B 1/3838 |
| 10,461,406 B2 | 10/2019 | Harper | |
| 2003/0060227 A1* | 3/2003 | Sekine | H01Q 1/242 |
| | | | 455/572 |
| 2004/0248523 A1* | 12/2004 | Nishimura | H01Q 3/44 |
| | | | 455/78 |
| 2005/0245204 A1* | 11/2005 | Vance | H01Q 9/0421 |
| | | | 455/248.1 |
| 2007/0135062 A1* | 6/2007 | Hwang | H01Q 1/246 |
| | | | 455/121 |
| 2007/0241977 A1* | 10/2007 | Vance | H04B 1/18 |
| | | | 343/745 |
| 2008/0129610 A1* | 6/2008 | Tsfati | H03D 3/007 |
| | | | 343/702 |
| 2009/0073076 A1* | 3/2009 | Skarp | H01Q 1/243 |
| | | | 343/860 |
| 2009/0152954 A1* | 6/2009 | Le | H02J 50/20 |
| | | | 307/110 |
| 2010/0127945 A1* | 5/2010 | Rousu | H01Q 5/357 |
| | | | 343/745 |
| 2010/0279747 A1* | 11/2010 | Imano | H01Q 1/243 |
| | | | 455/575.3 |
| 2011/0069516 A1* | 3/2011 | Greene | H02M 7/08 |
| | | | 363/126 |
| 2012/0319918 A1 | 12/2012 | Ramachandran et al. | |
| 2013/0052967 A1* | 2/2013 | Black | H04B 1/0458 |
| | | | 455/77 |
| 2013/0135060 A1* | 5/2013 | Lee | H04B 1/0458 |
| | | | 333/124 |
| 2013/0225088 A1* | 8/2013 | Anderson | H04B 17/30 |
| | | | 343/894 |
| 2014/0065982 A1* | 3/2014 | Suh | H04L 41/0809 |
| | | | 455/77 |
| 2015/0311881 A1* | 10/2015 | Nagumo | H01Q 1/50 |
| | | | 343/861 |
| 2015/0380812 A1* | 12/2015 | Black | H01Q 1/50 |
| | | | 343/861 |
| 2017/0179996 A1 | 6/2017 | Knepper et al. | |
| 2017/0214123 A1 | 7/2017 | Park et al. | |
| 2017/0248725 A1* | 8/2017 | Yang | H04B 1/3838 |
| 2019/0013790 A1* | 1/2019 | Ayranci | H04W 72/0453 |
| 2019/0052241 A1* | 2/2019 | Muto | H03F 3/195 |
| 2021/0058108 A1* | 2/2021 | Matsumoto | H03H 7/38 |
| 2021/0091805 A1* | 3/2021 | Park | H04B 1/0458 |
| 2021/0093253 A1* | 4/2021 | Sarkar | A61N 1/36542 |
| 2021/0126633 A1* | 4/2021 | Jang | G06F 1/1684 |
| 2021/0297095 A1* | 9/2021 | Tran | H03H 11/28 |
| 2022/0224303 A1* | 7/2022 | Khlat | H04B 1/40 |

FOREIGN PATENT DOCUMENTS

| | | |
|---|---|---|
| KR | 20120093980 A | 8/2012 |
| KR | 20170089524 A | 8/2017 |
| KR | 20180117197 A | 10/2018 |
| WO | 2011051554 A1 | 5/2011 |
| WO | 2017202313 A1 | 11/2017 |

* cited by examiner

PROXIMITY SENSOR FOR RF CONTROL

RELATED APPLICATION

This application claims benefit to U.S. Provisional Application No. 63/247,537, filed on Sep. 23, 2021. The entire contents of this application is hereby incorporated by reference in its entirety.

FIELD OF THE INVENTION

The present invention relates to an electronic component for adapting a pre-set matched impedance of an antenna, and to a method for adapting a pre-set matched impedance of an antenna.

BACKGROUND TO THE INVENTION

In radio frequency (RF) systems, impedance matching is commonly employed to improve overall RF system behaviour. Typically, impedance matching is performed for a specific use case of an RF system, e.g., for a free space condition in which no external objects, e.g., a human hand, are close to the RF system. Having external objects close to the RF system typically degrades performance of the RF system as an antenna of the RF system is then no longer optimally impedance matched since the external object may change the impedance of the antenna.

It is an object of the present invention to mitigate at least some of the disadvantages associated with impedance matching in RF systems.

SUMMARY OF THE INVENTION

According to a first aspect of the present invention there is provided an electronic component for adapting a pre-set matched impedance for an antenna, involving the features recited in claim 1. Further features of the electronic component are described in the dependent patent claims.

The invention relates to an electronic component for adapting a pre-set matched impedance for an antenna. The electronic component comprises 1) a capacitance measurement circuit for measuring capacitance of a sensor, wherein the measured capacitance is indicative of a use case of the antenna, 2) a Radio Frequency (RF) switch configured for electrically connecting at least one selected impedance to an RF output, wherein the at least one selected impedance is an impedance in a group of impedances having at least two elements, wherein the RF switch is capable of providing an electrical connection between any impedance in the group of impedances and the RF output, and wherein the at least one selected impedance is configured for adapting the pre-set matched impedance, and 3) a digital processor having access to at least one threshold and the measured capacitance. The digital processor is configured (i) to compare the measured capacitance of the sensor provided by the capacitance measurement circuit to the at least one threshold, (ii) to determine, based on the comparison, which impedance in the group of impedances is the at least one selected impedance, and (iii) to instruct the RF switch to provide an electrical connection between the at least one selected impedance and the RF output.

In an embodiment of the electronic component according to the invention, the electronic component comprises a tuneable capacitor, wherein the tuneable capacitor is configured to be connected to the antenna for adapting the pre-set matched impedance, and wherein the digital processor is configured to tune the tuneable capacitor based on the measured capacitance.

In a further embodiment of the electronic component according to the invention, the group of impedances comprises four impedances, and the electronic component comprises four output pins for electrically connecting the four impedances to the electronic component.

In a further embodiment of the electronic component according to the invention, the sensor is the antenna, and the antenna is embodied as a cellular antenna.

In a further embodiment of the electronic component according to the invention, the antenna is embodied as a planar inverted-F antenna.

In a further embodiment of the electronic component according to the invention, the sensor is a floating piece of conductor separate from the antenna.

In a further embodiment of the electronic component according to the invention, the floating piece of conductor is embodied as metal plate or as a printed circuit board (PCB) pad or as a flexible printed circuit (FPC) pad.

In a further embodiment of the electronic component according to the invention, the at least one selected impedance is configured to adapt the pre-set matched impedance between an RF transceiver and the antenna.

In a further embodiment of the electronic component according to the invention, the electronic component comprises the RF transceiver, and the RF transceiver is connected via the RF switch to the antenna.

According to a second aspect of the present invention there is provided a method for adapting a pre-set matched impedance for an antenna. The method comprises the following steps: 1) measuring a capacitance of a sensor, 2) comparing the measured capacitance to at least one threshold, 3) selecting at least one impedance from a group of impedances based on the comparison, and 4) providing an electrical connection between an RF output and the at least one selected impedance, wherein the provided electrical connection provides an electrical connection between the antenna and the at least one impedance.

In an embodiment of the method according to the second aspect of the present invention, the group of impedances comprises at least two elements, wherein each impedance in the group of impedances is an impedance for adapting the pre-set matched impedance to a different respective use case of the antenna.

According to a third aspect of the present invention there is provided a portable connected device, comprising an antenna and an electronic component according to the present invention, wherein the electronic component is configured to carry out a method according to the invention.

BRIEF DESCRIPTION OF DRAWINGS

Exemplar embodiments of the invention are disclosed in the description and illustrated by the drawings in which.

DETAILED DESCRIPTION OF DRAWINGS

Figure 1:
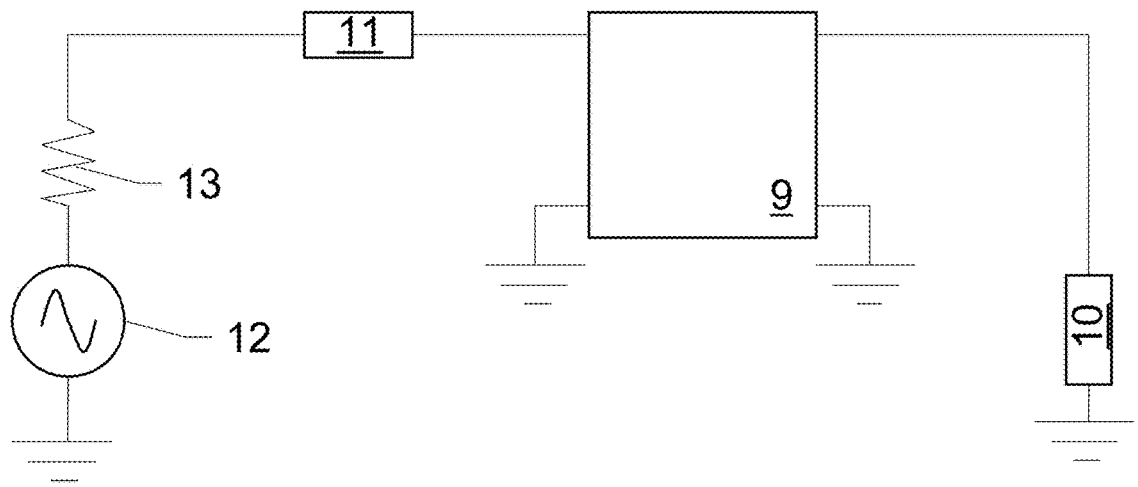
FIG. 1 shows a schematic depiction of a transmission chain in a radio frequency (RF) system.

FIG. 1 shows a schematic depiction of a transmission chain in an RF system. A voltage source 12 with an internal impedance 13 transmits an electric signal to a load 10 via a transmission line 13 of a certain length and with a certain characteristic impedance. Typically, the load 10 may electrically be described as a load impedance with a resistance and a reactance in series with the resistance. A matching network 9 is typically placed between the transmission line 11 and the load 10 to reduce reflections back from the load 10 into the transmission line 11. The voltage source 12 having an internal impedance 13 may be embodied as an RF transmitter, and the load 10 may be embodied as an antenna. Alternatively, the voltage source 12 having an internal impedance 13 may be embodied as an antenna, and the load 10 may be embodied as an RF receiver. One typical aim in RF system design is to maximize power delivered to the load 10.

As known in the prior art, the power delivered to the load 10 depends on the load impedance, wherein the load impedance typically shows frequency-dependent behaviour. The matching network 9 may comprise L-sections or T-sections as filters, for example. In any case, the matching network 9 typically comprises a finite number of parameters corresponding to lumped elements, wherein the finite number of parameters are set during an optimization step to minimize reflections from the load to the transmission line. In general, it is not possible to use the matching network to optimize reflection behaviour for all frequencies. In case the load impedance changes, matching provided by the matching network typically degrades, thereby worsening the performance of the entire RF system.

Figure 2:
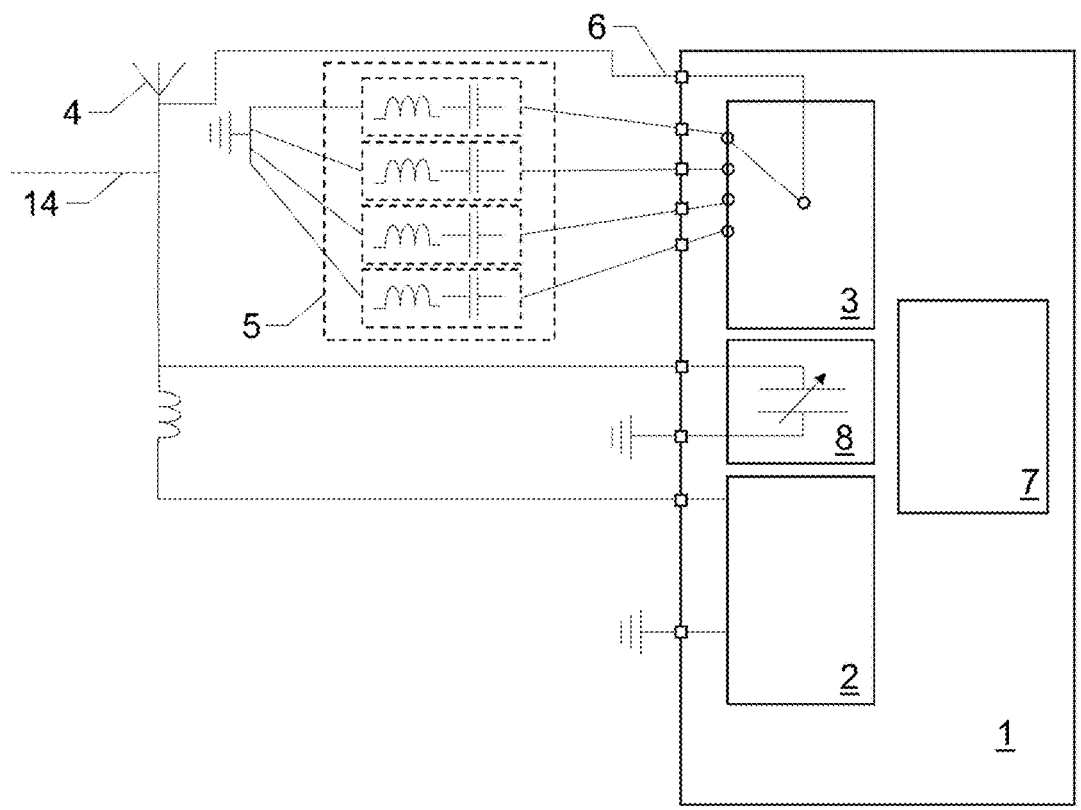
FIG. 2 shows a schematic depiction of an embodiment of a electronic component according to the invention for adapting a pre-set matched impedance for an antenna.

FIG. 2 shows a schematic depiction of an embodiment of an electronic component 1 according to the invention for adapting a pre-set matched impedance for an antenna 4. The electronic component 1 may be embodied as a microcontroller. The electronic component 1 may be provided on a single chip.

The antenna 4 may be connected to a radio frequency (RF) transceiver comprising both transmitter and receiver functionality via a transmission line (not shown in FIG. 2). The antenna 4 may correspond to the voltage source 12 or to the load 10 shown in FIG. 1, and the RF transmitter functionality may correspond to the voltage source 12, and the RF receiver functionality may correspond to the load 10. The antenna 4 has an impedance comprising a resistance and a reactance in series with the resistance. The impedance of the antenna 4 is frequency dependent. To minimize the signal reflection from the antenna back to the transmission line, impedance matching is commonly used, e.g., using a matching network as shown in FIG. 1.

The frequency-dependent impedance of the antenna 4 depends strongly on the use case of the antenna 4. The antenna 4 may, e.g., be integrated into a mobile phone. In case a human holds the mobile phone in a hand, the antenna 4 may be partly shielded and thereby have an altered impedance. In general, external objects in the vicinity of the antenna 4 may impact the impedance of the antenna 4, and the closer such external objects are to the antenna 4, the stronger may be the impact on the impedance of the antenna 4. An RF system comprising the antenna 4, the RF transceiver and the transmission line may have a matching network with a pre-set matched impedance, wherein said pre-set matched impedance is optimized for a specific use case of the antenna. The pre-set matched impedance may, e.g., be optimized for a free-space condition in which no external objects are close to the mobile phone in which the antenna 4 is integrated. In other use cases, the pre-set matched impedance typically leads to reduced performance of the RF system as the pre-set matched impedance is no longer optimal.

A mismatch between the antenna 4 and the pre-set matched impedance may lead to a degraded battery life. An RF transmitter, for example, may automatically increase output power to partially compensate antenna mismatch, leading to a faster drain of battery power.

The electronic component 1 comprises a capacitance measurement circuit 2, wherein said capacitance measurement circuit 2 is configured to measure a capacitance of a sensor. As shown in FIG. 2, the sensor may correspond to the antenna 4, i.e., the capacitance measurement circuit 2 may be configured to measure the capacitance of the antenna 4. Alternatively, the sensor may be embodied as a floating piece of conductor separate from the antenna 4, wherein said floating piece of conductor may, e.g., be embodied as a metal plate or as a printed circuit board (PCB) pad or as a flexible printed circuit (FPC) pad. The floating piece of conductor may be designed in such a way that its detection range covers a sufficient volume around critical areas of the antenna 4. In any case, the sensor is preferentially arranged close to the antenna 4. The capacitance of the sensor in general changes in case external objects are close to the sensor (respectively close to the antenna 4 in case the sensor is embodied as the antenna 4 as shown in FIG. 2). The capacitance measurement circuit 2 may therefore provide proximity sensing functionality.

The capacitance of the sensor may be measured relatively or absolutely. If the capacitance is determined relatively, only changes of the capacitance may be recorded, wherein said changes may point to an external object moving towards or away from the antenna 4. If the capacitance is determined absolutely, actual values of the capacitance are measured.

The electronic component 1 further comprises a digital processor 7, wherein said digital processor 7 has access to at least one threshold. The at least one threshold may be saved in a memory on the electronic component 1. The digital processor 7 is configured to compare the measured capacitance provided by the capacitance measurement circuit 2 to the at least one threshold. In case the at least one threshold comprises only one threshold, this one threshold may be such that two cases are distinguished: 1) an external object is close to the antenna 4, 2) an external object is far away from the antenna 4. By comparing the measured capacitance to the one threshold, the digital processor 7 may decide whether an external object is close to the antenna 4. In case the at least one threshold comprises a plurality of thresholds, the plurality of thresholds may be used for partitioning space around the antenna 4 into a plurality of regions, wherein said plurality of regions may correspond to and may be indexed by the plurality of thresholds. Besides capacitive proximity sensing, proximity sensing may be further improved using permittivity measurements (e.g., human body versus a table on which a mobile phone rests), movement detection, start-up detection etc.

Based on the comparison of the measured capacitance to the at least one threshold, the digital processor 7 may decide whether (and if so, potentially also where) an external object is located close to the antenna 4. Since the presence of an external object in the vicinity of the antenna 4 typically changes its impedance, the pre-set matched impedance may need to be adapted. The electronic component 1 comprises an RF switch 3, wherein the digital processor 7 is configured to at least partly control the RF switch 3. The RF switch 3 can establish an electric connection between an RF output 6 and any impedance in a group of impedances 5. The impedances in the group of impedances 5 are connected to a ground. The RF switch 3 may be configured in such a way that it can establish—at a specific time and in parallel—an electric connection between a plurality of impedances in the group of impedances 5 and the RF output 6 respectively. Alternatively, the RF switch 3 may be configured in such a way that it can establish—at a specific time—only an electric connection between one impedance in the group of impedances 5 and the RF output 6. The group of impedances 5 may be physically realized outside the electronic component 1 as shown in FIG. 2. Alternatively, the group of impedances 5 may also be directly integrated into the electronic component 1. Each impedance in the group of impedances 5 may correspond to a different use case of the RF system; said differently, each impedance in the group of impedances 5 may be used for adapting the pre-set matched impedance to the new use case: if a user's hand is, e.g., close to the antenna 4, the pre-set matched impedance may need to be adapted to keep satisfactory performance of the mobile phone in which the antenna 4 is integrated. The adapted pre-set matched impedance provides an improved connectivity. Providing an RF switch 3 which can jointly establish electric connection between a plurality of impedances in the group of impedances 5 and the RF output 6 may increase the possible number of use cases of the RF system, as combinations of different impedances in the group of impedances 5 may be used for adapting the pre-set matched impedance to further use cases of the RF system.

The antenna 4 may be connected via separate cables 14 to the matching network which provides the pre-set matched impedance. Based on instructions by the digital processer 7, the RF switch 3 establishes a connection between at least one selected impedance from the group of impedances 5 and the RF output 6. The antenna 4 may be connected via the RF output 6 to the electronic component 1. The at least one selected impedance adapts the pre-set matched impedance, creating an adapted matched impedance which is better suited to the current use case of the antenna 4 than the pre-set matched impedance. The impedances in the group of impedances 5 may be pre-designed so that the RF system comprising the antenna 4 may provide satisfactory performance in a wide range of different conditions.

The electronic component 1 may also directly comprise a RF transceiver, wherein the RF transceiver may be connected to the antenna 4 via the RF switch 3. In this case, the at least one selected impedance from the group of impedances 5 may be connected to the pre-set matched impedance.

In the embodiment of the electronic component 1 schematically shown in FIG. 2, the electronic component 1 further comprises a tuneable capacitor 8. The tuneable capacitor 8 may be automatically tuned by the digital processor 7; alternatively, or in addition to the tuning by the digital processor 7, the tuneable capacitor 8 may potentially also be tuned by hand by an operator of the RF system (or by the operator of a mobile phone or more generally a portable connected device). The tuneable capacitor 8 may be used to "interpolate" between the fixed number of impedances in the group of impedances 5, or it may be used to "interpolate" between combinations of the fixed number of impedances in the group of impedances 5; said differently, the tuneable capacitor 8 may be used to fine-tune the adapting of the pre-set matched impedance by the at least one selected impedance from the group of impedances 5.

In the electronic component 1 according to the invention, the computations needed for adapting the pre-set matched impedance to changed circumstances are directly carried out on the electronic component 1. A connection to an external host, e.g., a central processing unit on a mobile phone, is not required for adapting the pre-set matched impedance. Adaptation of the pre-set matched impedance may be carried out autonomously by the electronic component 1 according to the invention. Furthermore, the electronic component 1 according to the invention can be modularly added to already designed RF systems to improve their performance. The electronic component 1 according to the invention may also lead to increased battery life of, e.g., a mobile phone as the RF transmitter needs to provide less output power to enable satisfactory communication in the case of having an adapted pre-set matched impedance compared to the original pre-set matched impedance.

The invention claimed is:

1. Electronic component on a single chip for adapting a pre-set matched impedance for an antenna, comprising
  1) A RF pin connectable to the antenna,
      a capacitance sense pin connectable to the antenna,
      a group of selectable first pins connectable to the antenna via the RF pin,
      a second pin connectable to the antenna,
    wherein the RF pin, the capacitance sense pin, the selectable first pins and the second pin are separated and distinct pins,
  2) a capacitance measurement circuit connected to the capacitance sense pin for measuring a capacitance of a sensor or of the antenna,
  3) a Radio Frequency (RF) switch configured to establish a selectable connection between a selected first pin in the group of selectable first pins and the RF pin, having at least two elements, wherein the RF switch is capable of providing an electrical connection between any pin in the group of selectable first pins and the RF pin,
  4) a variable capacitor connectable to the antenna via the second pin of the electronic component, and
  3) a digital processor having access to at least one threshold and the measured capacitance, wherein the digital processor is configured
      (i) to compare the measured capacitance of the sensor provided by the capacitance measurement circuit to the at least one threshold,
      (ii) to decide, based on the comparison, whether an external object is in the vicinity of the antenna,
      (iii) to determine, based on the comparison, which impedance in the group of impedances is the at least one selected impedance, and
      (iv) to instruct the RF switch to provide an electrical connection between the at least one selected impedance and the RF output,
      (v) to change a capacitance of the variable capacitor based on the measured capacitance,
    wherein the antenna is arranged to be connected to a matching network which provides the pre-set matched impedance,
    wherein the at least one selected impedance adapts the pre-set matched impedance, creating an adapted matched impedance which is better suited for the antenna than the pre-set matched impedance.

2. Electronic component according to claim 1, the RF pin being connected to a cellular antenna.

3. Electronic component according to claim 2, wherein the antenna is a planar inverted-F antenna.

4. Electronic component according to claim 1, the capacitance sense pin being connected to a floating piece of conductor separate from the antenna acting as sensor.

5. Electronic component according to claim 4, wherein the floating piece of conductor is metal plate or as a printed circuit board (PCB) pad or as a flexible printed circuit (FPC) pad.

6. Electronic component according to claim 1, wherein the selectable first pins are each connected to one impedance in a group of impedances for adapting the pre-set matched impedance between an RF transceiver and the antenna.

7. Electronic component according to claim 6, wherein the electronic component comprises the RF transceiver, and wherein the RF transceiver is connected via the RF switch to the antenna.

* * * * *